(12) United States Patent
Gabay et al.

(10) Patent No.: US 11,706,252 B1
(45) Date of Patent: Jul. 18, 2023

(54) DETECTING MALWARE INFECTION PATH IN A CLOUD COMPUTING ENVIRONMENT UTILIZING A SECURITY GRAPH

(71) Applicant: Wiz, Inc., New York, NY (US)

(72) Inventors: Elad Gabay, Tel Aviv (IL); Yaniv Shaked, Tel Aviv (IL); Alon Schindel, Tel Aviv (IL); Roy Reznik, Tel Aviv (IL); Ami Luttwak, Binyamina (IL)

(73) Assignee: WIZ, INC., New York, NY (US)

( * ) Notice: Subject to any disclaimer, the term of this patent is extended or adjusted under 35 U.S.C. 154(b) by 0 days.

(21) Appl. No.: 18/087,936

(22) Filed: Dec. 23, 2022

Related U.S. Application Data

(60) Provisional application No. 63/266,033, filed on Dec. 27, 2021.

(51) Int. Cl.
*H04L 9/40* (2022.01)
*G06F 21/53* (2013.01)

(52) U.S. Cl.
CPC ............ *H04L 63/145* (2013.01); *G06F 21/53* (2013.01)

(58) Field of Classification Search
CPC . H04L 63/145; H04L 63/1408; H04L 43/045; H04L 2463/146; G06F 16/902; G06F 21/53
See application file for complete search history.

(56) References Cited

U.S. PATENT DOCUMENTS

| | | | | |
|---|---|---|---|---|
| 8,341,745 | B1 * | 12/2012 | Chau | G06F 21/56 726/25 |
| 8,499,354 | B1 | 7/2013 | Satish et al. | |
| 9,165,142 | B1 | 10/2015 | Sanders et al. | |
| 10,958,667 | B1 * | 3/2021 | Maida | H04L 63/1425 |
| 2011/0023120 | A1 * | 1/2011 | Dai | G06F 21/568 726/23 |
| 2012/0323829 | A1 * | 12/2012 | Stokes | G06F 18/2323 706/50 |
| 2019/0182273 | A1 * | 6/2019 | Walsh | H04L 63/1425 |
| 2020/0076832 | A1 * | 3/2020 | Jusko | H04L 63/1416 |

* cited by examiner

*Primary Examiner* — Ali S Abyaneh
(74) *Attorney, Agent, or Firm* — M&B IP Analysts, LLC

(57) ABSTRACT

A system and method detect a malware infection path in a compute environment. The method includes detecting a malware object on a first workload in a computing environment including a plurality of workloads, wherein the first workload is represented by a resource node on a security graph, the security graph including an endpoint node representing a resource which is accessible to a public network; generating a potential infection path between the resource node and the endpoint node including at least a second resource node connected to the resource node; inspecting a second workload of the plurality of workloads represented by the second resource node; determining that the potential infection path is a confirmed infection path, in response to detecting the malware on the second workload; and determining that the potential infection path is not an infection path, in response to detecting that the second workload does not include the malware.

21 Claims, 8 Drawing Sheets

DETECTING MALWARE INFECTION PATH IN A CLOUD COMPUTING ENVIRONMENT UTILIZING A SECURITY GRAPH

CROSS-REFERENCE TO RELATED APPLICATIONS

This application claims the benefit of U.S. Provisional Application No. 63/266,033 filed on Dec. 27, 2021, the contents of which are hereby incorporated by reference.

TECHNICAL FIELD

The present disclosure relates generally to cybersecurity, and specifically to utilizing a security graph to detect malware threats across technology stacks.

BACKGROUND

Malicious software, commonly referred to as malware, is a class of software which is intended to cause harm to a computer system. The term is used as an umbrella term, under which various computer-based threats are referred to, such as viruses, worms, spyware, trojan horses, ransomware, and the like.

Viruses and worms are a type of infectious malware, meaning that they are intended to infect a computer device or environment, as opposed, for example, to using a software backdoor, which may or may not be there intentionally, and allows access to the device or environment which possesses the backdoor.

A computer virus is typically embedded in an executable software code, and is present on a target computer without the knowledge of the computer's user. A virus may spread to other executable software code files on the computer, and when those are accessed by other computers, the virus spreads there as well.

A worm is typically a stand-alone software or code, characterized in actively detecting other computers or network resources to which it can spread, for example by copying a version of itself to another computer over the network. While a virus is a passive attack (i.e. requires a user to actively participate by running the infected software), a worm is an active attack which requires no assistance from a user in order to spread to other compute devices.

Certain types of malware may have elements of a worm or a virus, depending on the creators preference. For example, ransomware is a type of malware which blocks access to a computer device, for example by encrypting a disk of the computer device using a secret known only to the attacker. The ransomware then offers the user the unlock the computer device in exchange for a ransom, typically as untraceable digital currency, such as Bitcoin. Ransomware may spread as either a virus or a worm.

For attackers, it is clear that worm based malware provides a lucrative return on investment. Unless contained, a worm will continue to infect computer devices in a network, and each such infected computer is an effortless opportunity for income for the attacker. Utilizing a backdoor to infect a first compute workload in a cloud environment, for example, can easily compromise a large number of workloads.

Dealing with malware can follow principles of dealing with any attack, and solutions are therefore available for prevention, mitigation, response, and recovery. Antivirus software is an example of prevention and mitigation. The antivirus software is aimed to both prevent malware from entering the computer on which the antivirus is executed, and also mitigate, for example by quarantining infected files.

A disadvantage of antivirus software is that while running the software computer performance can be hampered significantly. Performance degradation can be so severe as to require disabling the antivirus software when performing system updates, installing patches, etc.

Various cloud solutions exist to combat malware. For example, bucketAV™ scans Amazon® Web Services (AWS) S3 buckets by implementing a virtual machine (VM) running in the user's AWS account. However, such solution requires deploying a VM, and when scaling deploying multiple VMs, which consume a large amount of resources. Additionally, these solutions are required on top of other cybersecurity solutions, such as identity and access management software, and may be based on technology stacks, requiring a separate solution for each technology stack.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting a malware infection path in a compute environment. The method comprises: detecting a malware object on a first workload in a computing environment, the computing environment including a plurality of workloads, wherein the first workload is represented by a resource node on a security graph, the security graph further including an endpoint node representing a resource which is accessible to a public access network; generating a potential infection path between the resource node and the endpoint node including at least a second resource node, wherein the second resource node is connected to the resource node; inspecting a second workload of the plurality of workloads represented by the second resource node; determining that the potential infection path is a confirmed infection path, in response to detecting the malware object on the second workload; and determining that the potential infection path is not an infection path, in response to detecting that the second workload does not include the malware object.

Certain embodiments disclosed herein also include a non-transitory computer readable medium having stored thereon causing a processing circuitry to execute a process, the process comprising: detecting a malware object on a first workload in a computing environment, the computing environment including a plurality of workloads, wherein the first workload is represented by a resource node on a security graph, the security graph further including an endpoint node representing a resource which is accessible to a public access network; generating a potential infection path between the resource node and the endpoint node including at least a second resource node, wherein the second resource node is connected to the resource node; inspecting a second workload of the plurality of workloads represented by the second resource node; determining that the potential infection path is a confirmed infection path, in response to detecting the malware object on the second workload; and determining that the potential infection path is not an infection path, in response to detecting that the second workload does not include the malware object.

Certain embodiments disclosed herein also include a system for detecting a malware infection path in a compute environment. The system comprises: a processing circuitry; and a memory, the memory containing instructions that, when executed by the processing circuitry, configure the system to: detect a malware object on a first workload in a computing environment, the computing environment including a plurality of workloads, wherein the first workload is represented by a resource node on a security graph, the security graph further including an endpoint node representing a resource which is accessible to a public access network; generate a potential infection path between the resource node and the endpoint node including at least a second resource node, wherein the second resource node is connected to the resource node; inspect a second workload of the plurality of workloads represented by the second resource node; determine that the potential infection path is a confirmed infection path, in response to detecting the malware object on the second workload; and determine that the potential infection path is not an infection path, in response to detecting that the second workload does not include the malware object.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
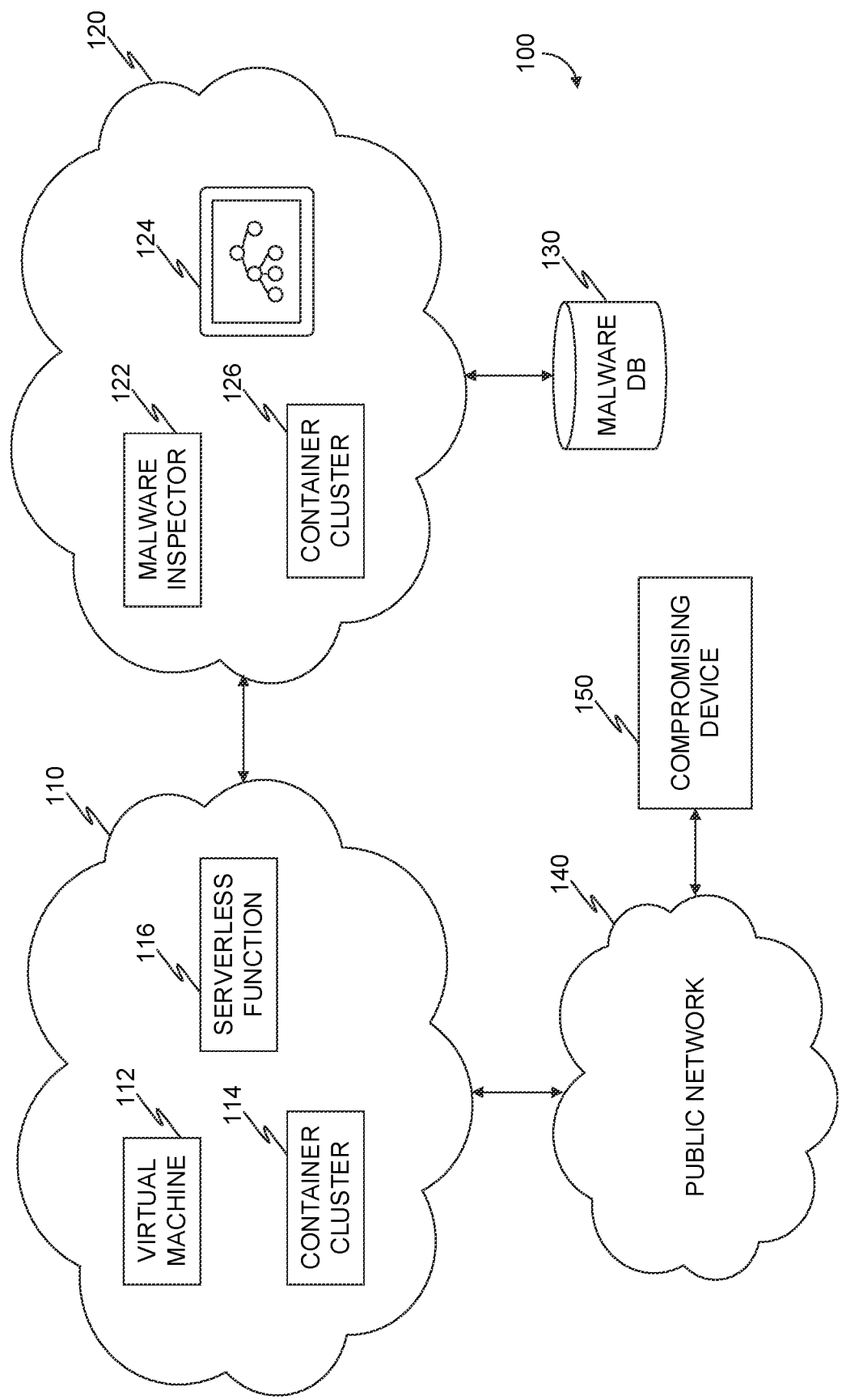
FIG. 1 is a schematic diagram of cloud computing environments utilizing malware detection through a security graph, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A system and method for detecting malware infection paths includes a security graph, in which principals and resources of a first computing environment are represented as nodes, according to an embodiment. The security graph further includes enrichment nodes, such as an endpoint node which represents a connection to a public network (e.g., the Internet), the public network being separate from the first computing environment. A malware object is detected on a resource, for example by an inspector which is configured to access the resource, a disk of the resource, a snapshot of the resource, a clone of the resource, and the like, according to an embodiment. When a malware object is detected on a resource, such as a virtual machine, container, or serverless function, the security graph is traversed, according to an embodiment, to detect potential infection paths between a node representing the resource and one or more endpoints. In an embodiment, resources along the infection path are prioritized for malware inspection, in order to decrease the response time to a malware threat. Thus resources which are at higher risk of being infected are inspected first, in order to slow down and stop the spread of the malware object.

While it is recognized in this regard that detecting a malware infection path is something a human can perform, detection of a malware infection path is not possible to do at least in scale and in speed which is required to effectively provide malware detection. For example, a malware infection path can change rapidly, based on resources which are spun up or spun down in succession. Therefore, a malware path detected at a speed a human is capable of detecting may already change by the time the resources along the path are inspected. Detection of a malware infection path needs to be performed fast due to the changing, dynamic, nature of a cloud computing environment structure, due to the speed at which a malware object can infect resources, and due to the cost which a malware infection incurs (e.g., the compute resources which are lost to the malware).

Furthermore, a human is incapable of reliably and consistently detecting a malware object, a malware infection path, and the like. In an embodiment the system disclosed overcomes at least this by detecting malware objects using objective criteria consistently and reliably, detecting a malware infection path utilizing objective criteria consistently and reliably, neither of which is possible by a human operator who uses subjective criteria, or even when applying criteria objectively, cannot apply objective criteria reliably and consistently.

FIG. 1 is an example schematic diagram 100 of cloud computing environments utilizing malware detection through a security graph, implemented in accordance with an embodiment. A cloud computing environment is implemented, in an embodiment, utilizing, for example, Amazon® Web Services (AWS), Microsoft® Azure, Google® Cloud Platform (GCP), and the like. In an embodiment a cloud computing environment includes a virtual private cloud (VPC) environment, which is an environment within the cloud computing environment which is accessible only to preauthorized cloud entities, such as principals and resources. In an embodiment a resource is, for example, a virtual machine, a serverless function, a software container, and the like. In some embodiments, a principals is a cloud entity which acts on resources, and is, for example, a user account, a role, a service account, and the like.

In an embodiment, a first cloud environment 110 is implemented in a first cloud computing environment, e.g., AWS®, and a second cloud environment 120 is implemented in a second cloud computing environment, e.g., GCP. In some embodiments, the first cloud environment 110 and the second cloud environment 120 are each implemented as a VPC in a first cloud computing environment, e.g., in AWS. In an embodiment, the first cloud environment 110 is a production environment, meaning that the workloads, services, and other cloud entities deployed therein, are utilized to service a business, users, and the like. This is as opposed to a staging environment, where workloads primarily exist for testing functions and do not serve as the primary computing environment, a testing environment where workloads, roles, principals, and the like are tested, or a code environment including a command line interface, where declaratory code is generated from which cloud entities are deployed.

In an embodiment the first cloud environment 110 includes a plurality of resources, such as virtual machines, software container clusters, and serverless functions. In some embodiments, a virtual machine, such as VM 112, is implemented using, for example, Oracle® VirtualBox. In certain embodiments, software container clusters, such as software container cluster 114, is implemented using Kubernetes®, and serverless functions, such as serverless function 116, is implemented using AWS Lambada, Google® Cloud Functions, and the like.

In an embodiment, a resource is provisioned elements of the first cloud environment 110, for example, by an orchestrator (not shown) of the first cloud environment 110. In an embodiment, elements of the first cloud environment 110 include storage resources, memory resources, processing resources, and the like. For example, S3 in AWS provides storage for a serverless function 116, according to an embodiment.

In an embodiment the first cloud environment 110 is configured to access, be accessed by, and the like, a compromising device 150, which is connected to the first cloud environment 110 through a public network 140. In some embodiments a public network 140 is, for example, the Internet. In certain embodiments the compromising device 150 infects a workload in the first cloud environment 110 with malware code. For example, according to an embodiment the compromising device 150 is configured to store the malware code in a storage which is accessed by a workload. Once a workload becomes infected, the infected workload may infect other workloads in the first cloud environment 110, for example, by accessing shared resources, establishing communication paths between the infected workload and another workload, etc., in accordance with an embodiment.

In some embodiments an inspecting cloud environment is implemented as a second cloud environment 120. In an embodiment, the second cloud environment 120 is implemented as a VPC using the same infrastructure which the first cloud environment 110 is implemented on. For example, the first cloud environment 110 is implemented as a first VPC in GCP, and the second cloud environment 120 is implemented as a second VPC in GCP, according to an embodiment.

In an embodiment, the inspecting cloud environment 120 includes a malware inspector 122, a software container 126, and a security graph 124. The malware inspector 122 is implemented as a workload, according to an embodiment. In some embodiments, the malware inspector 122 is implemented as a node in a container cluster, for example in a software container 126. In certain embodiments the malware inspector 122 may detect malware objects based on at least a signature of malware code, accessed from a third party provider, such as malware database 130.

In an embodiment, a software container 126 is configured to provision inspecting nodes, such as a malware inspecting node, wherein each node is configured to inspect, for example, a disk for a malware object. In an embodiment the disk is associated with a particular workload. In some embodiments, the disk is generated from a clone, a copy, a snapshot, and the like, which is generated in the first cloud environment 110.

In some embodiments, provisioning a malware inspector on the fly (i.e., only when needed, as opposed to a persistent workload which is always deployed, whether used or not) allows only utilizing compute resources as necessary, together with the ability to scale up or down quickly according to the cloud environment.

For example, in an embodiment a production cloud environment, such as the first cloud environment 110 is configured to detect a sudden rise in demand for a service provided by it. In an embodiment this is performed by a serverless function which is configured to monitor requests for service for the cloud computing environment.

In response to detecting the rise, for example when a number of requests exceed a predetermined threshold, the first cloud environment 110 is configured to provision additional workloads to keep up with the demand. This is a major advantage of cloud computing environments. However, each such workload has a potential to become a cybersecurity risk. Therefore, the ability to scale the inspecting cloud environment to match the production cloud environment is advantageous, and in places where cost is directly tied to resource usage, it is also cost efficient to do so.

In an embodiment, a security graph 124 is stored on a graph database, such as Neo4j®, and is configured to represent the first cloud environment. In an embodiment, principals, resources, enrichments, and the like, are represented as nodes on the security graph 124. In some embodiments representation of a cloud entity on a security graph includes generating a node representing the cloud entity, for example based on the entity type (e.g., resource, principal, type of resource, type of principal, etc.). In an embodiment the node is generated based on a predefined data structure, and values are populated in the data structure based, for example, on data generated by an inspector which is configured to inspect the cloud entity.

In some embodiments the inspecting cloud environment 120 further includes, or has access to, a malware database 130. In an embodiment malware database 130 includes identifiers of malware code. In certain embodiments an identifier is a signature of a malware code, a signature generated from a file containing malware code, a list of behavior characteristics, a combination thereof, and the like.

A behavior characteristic is, according to an embodiment, initiating a connection with a suspicious server (e.g., a web server having an IP address which is flagged as an IP address from which is involved in suspicious network traffic), utilizing processing resources exceeding a threshold, utilizing memory resources exceeding a threshold, utilizing storage resources exceeding a threshold, a combination thereof, and the like. In certain embodiments, the malware database 130 further contains information, instructions, a combination thereof, and the like, which when adapted and executed, allow to detect, to quarantine, to remove, to mitigate, and the like, the malware code.

Figure 2:
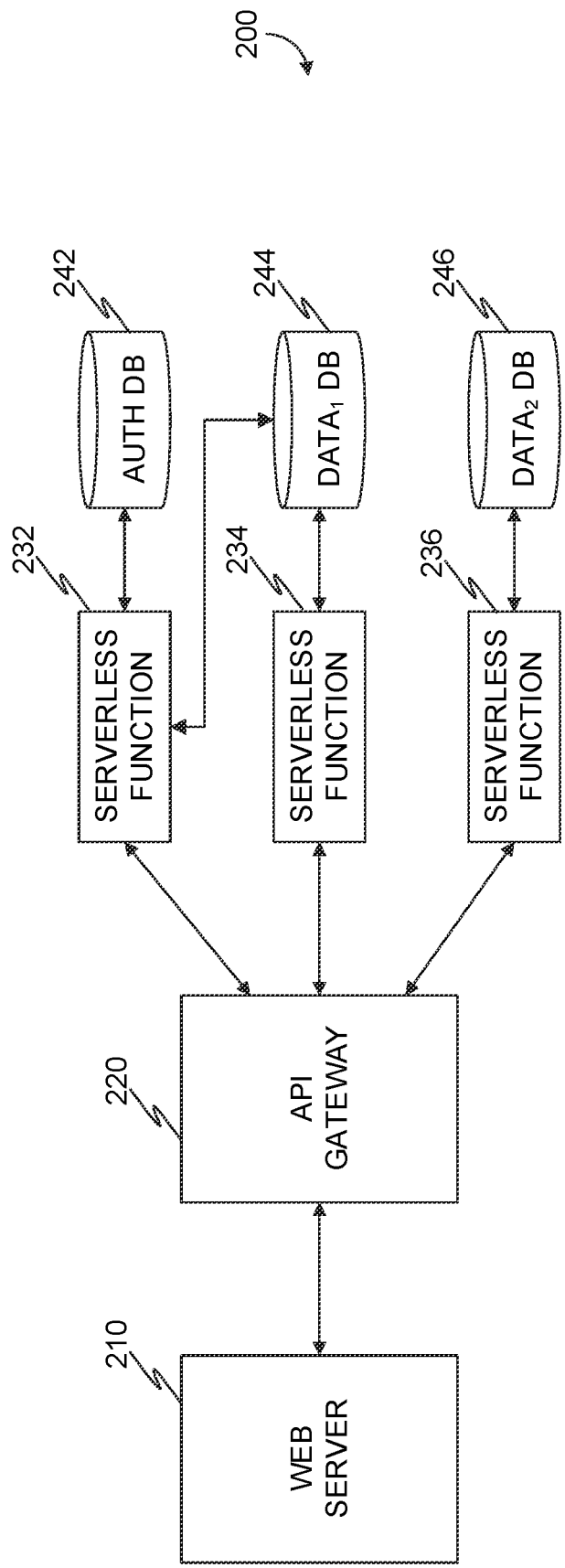
FIG. 2 is a diagram of a first cloud environment, implemented according to an embodiment.

FIG. 2 is an example of a diagram of a first cloud environment 200, implemented according to an embodiment. The first cloud environment 200 includes a plurality of workloads (i.e., resources), such as databases, serverless functions, an API (application programming interface) gateway, a web server, and the like.

In an embodiment, a web server 210 provides access between the API gateway 220 and another network environment, such as the internet. The API gateway 220 is configured to provide access to a plurality of serverless functions 232, 234 and 236, for example by receiving instructions according to a predetermined structure, and translating the received instructions to instructions executable by a serverless function to which the instruction calls, according to an embodiment.

In some embodiments, a first serverless function 232 is configured to communicate with an authentication database 242. In an embodiment, the authentication database 242 is implemented as part of an identity and access management (IAM) system (not shown). The authentication database 242 includes usernames, secrets, a combination thereof, and the like, which are used for authenticating users, in certain embodiments. In some embodiments the first serverless function 232 is configured to access (i.e., read from and write to) a first database 244.

In an embodiment, a second serverless function 234 is configured to read from and write to the first database 244. In some embodiments, a third serverless function 236 is configured to read from and write to a second database 246. Each of the above-described workloads is implemented, in an embodiment, as a virtual workload in a cloud computing environment. A representation of this cloud computing environment in a security graph is described in more detail in FIG. 3 below.

Figure 3:
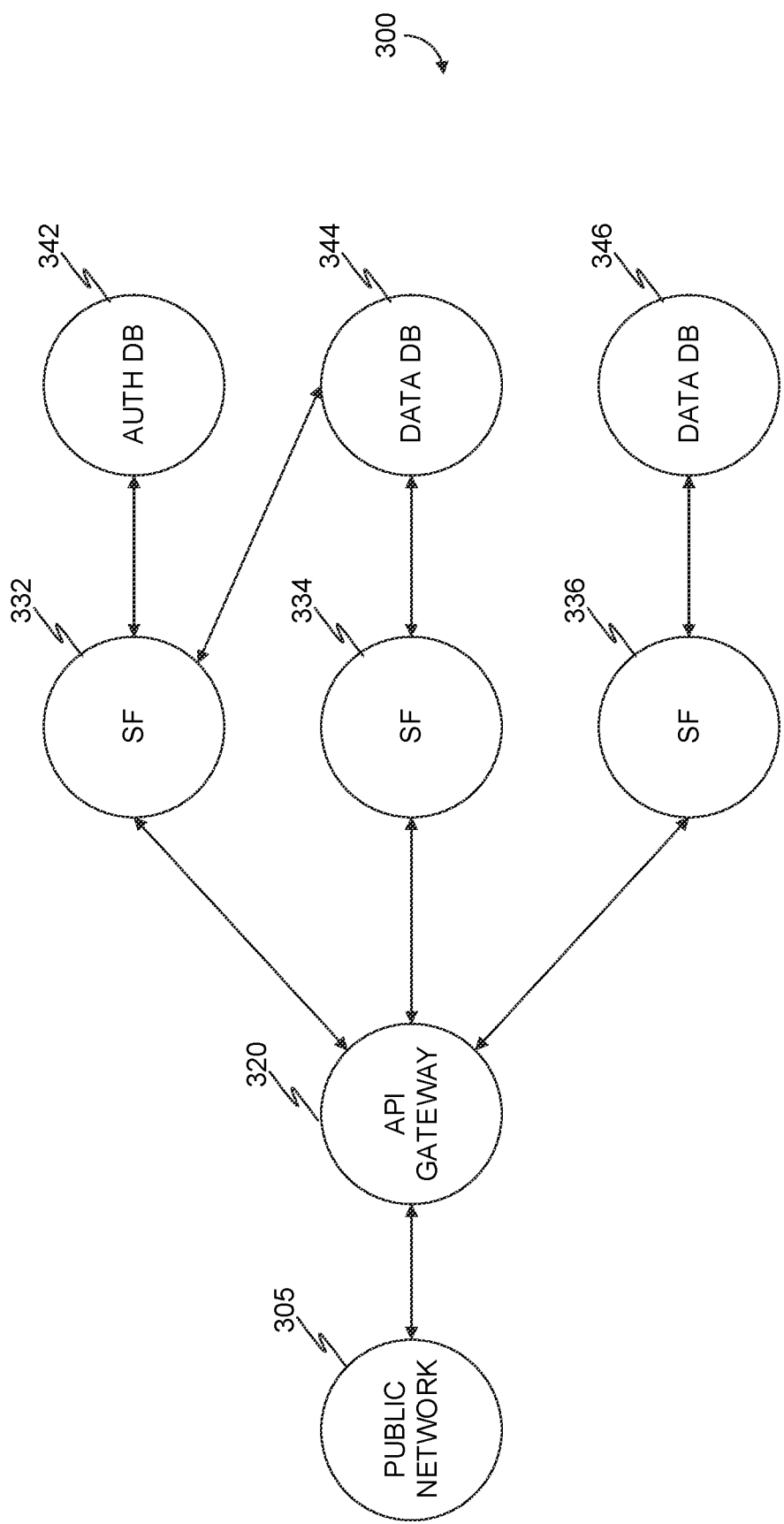
FIG. 3 is a security graph representing a portion of a first cloud environment, implemented according to an embodiment

FIG. 3 is an example of a security graph 300 representing a portion of a first cloud environment, implemented according to an embodiment. In an embodiment, a security graph is generated by a graph database, which is configured to receive information from inspector workloads in computing environments and generate a representation based on a data schema which describes cloud entities, such as resources, principals, policies, enrichments, and the like.

In an embodiment a security graph portion 300 is configured to represent the workloads of the cloud computing environment described in more detail in FIG. 2 above. Resources, principals, and the like, are represented by nodes, each node having a data structure based on the type of cloud entity represented by the node, and based on the data schema. In certain embodiments, the nodes are connected by vertices, which specify a type of connection between the nodes (e.g., "can access", "includes", "is deployed on", etc.).

For example, in an embodiment a public network (e.g., the Internet) is represented in the security graph 300 by an enrichment node 305. Connection to such a node (e.g., by a 'can access' vertex) indicates that a workload represented by a node connected thereto is configured to access, be accessed from, a combination thereof, and the like, a public network. According to an embodiment an API gateway (such as API gateway 220) is represented by a resource node 320. The resource node 320 representing the API gateway is generated based on the data schema to include data fields which are unique to API gateways, in an embodiment.

Additionally, in some embodiments a first serverless function is represented by a first resource node 332, a second serverless function is represented by a second resource node 334, and a third serverless function is represented by a third resource node 336. In an embodiment, the serverless function resource nodes 332 through 336 have data fields which are common to the API gateway resource node 320 (e.g., resource name, resource type), and data fields which are not common with the API gateway resource node 320 (e.g., trigger identifier, gateway version, etc.).

In an embodiment, the first resource node 332 is connected with 'can access' vertices to a resource node 342 representing the authentication database, and a resource node 344 representing the first database.

In some embodiments, malware code is stored in the first database (represented by a resource node 344). For example, the malware code is configured to access the first database through a vulnerability in the second serverless function (represented by the second resource node 334). However, since the first serverless function accesses the first database, the authentication database is in danger of becoming compromised if the malware code is able to be accessed by the first serverless function.

The representation of a cloud computing environment on a security graph allows to detect such potential infection paths between resources and store such a representation in an efficient manner which reduces use of computation resources. For example, by storing an enrichment node indicating a public network connection, it is not necessary to store this data on each and every node which represents a workload which is connected to the public network, thereby deduplicating data and leading to storage reduction.

Figure 4:
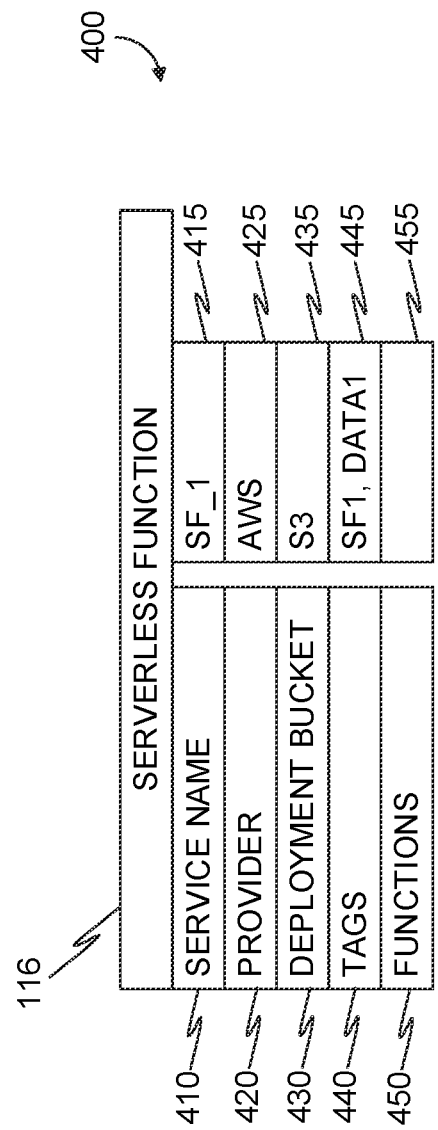
FIG. 4 is an example schematic illustration of a representation of a serverless function, implemented in accordance with an embodiment.

FIG. 4 is an example schematic illustration of a representation 400 of a serverless function, implemented in accordance with an embodiment. The serverless function 116 of FIG. 1 is represented, according to an embodiment, by a plurality of data fields and corresponding values. For example, a first data field 410 indicates a name of the serverless function, with a value 415 of 'SF_1', according to an embodiment. A second data field 420 indicates a name of the infrastructure providing the service, with a value 425 of 'AWS' for Amazon® Web Services, according to some embodiments. A third data field 430 indicates a deployment bucket, which is where data is accessed by the serverless function, in this example having a value 435 of 'S3', which is a storage system used by AWS, according to an embodiment. A fourth data field 440 indicates tags, which in certain embodiments are utilized by a security graph configured to generate a view of certain nodes (e.g., render for display only nodes having certain tags, or connected to nodes having the specified certain tags).

While the above FIGS. 2 through 4 discuss embodiments of serverless functions, it should be clear that the disclosed techniques apply to other resources of computing environments, such as virtual machines, software containers, and the like. Furthermore, the teachings herein with respect to the first cloud environment 110 of FIG. 1 above are applied to computing environments which are networked, but not necessarily part of a cloud computing environment, according to some embodiments.

Figure 5:
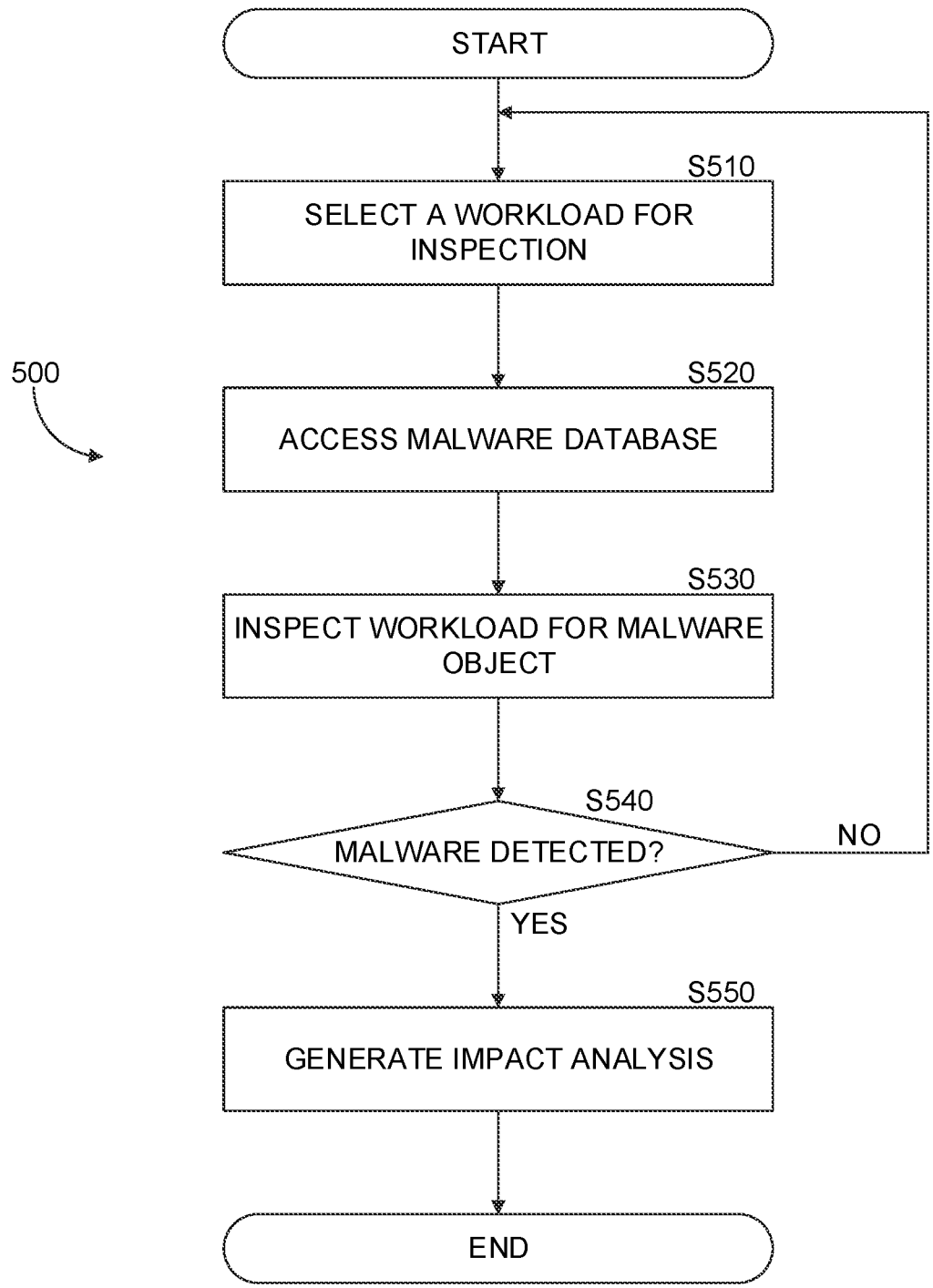
FIG. 5 is a flowchart of a method for generating an impact analysis for an infected workload, implemented according to an embodiment.

FIG. 5 is an example flowchart 500 of a method for generating an impact analysis for an infected workload, implemented according to an embodiment. An impact analysis is, according to an embodiment, a simulation of a workload being infected with a malware object, in order to determine what potential damage is inflicted on a computing environment as a result of the malware infection. This is advantageous as it allows to detect weak spots in cybersecurity coverage, and address such weaknesses to overcome the cybersecurity risk.

At S510, a workload is selected for inspection. In an embodiment, the workload is selected by an inspector of an inspecting cloud environment, such as the inspecting cloud environment 120 of FIG. 1. For example, a workload is selected based on a predetermined list of workloads. In an embodiment, the list of workloads is generated by performing network discovery to detect identifiers of workloads deployed in a cloud computing environment.

In some embodiments, workloads are periodically inspected. In certain embodiments, instructions to select another workload for inspection is received manually from a user of an inspecting cloud environment. For example, in some embodiments a client device is configured to generate a request to add a workload to the list of inspectable workloads. In an embodiment, a workload is a resource which includes an application, an operating system, a storage resource, a memory resource, a combination thereof, and the like. A workload is implemented as a virtual machine, container cluster, serverless function, and the like, according to an embodiment.

At S520, a malware database is accessed. In an embodiment, the malware database is accessed to retrieve a signature which is used to detect a malware object on the selected workload. For example, in an embodiment the malware database is accessed to select a signature of a first malware type. In certain embodiments, a plurality of malware databases are accessed. For example, in an embodiment a first malware database is accessed to retrieve a first signature of a first malware object, and a second malware database is accessed to retrieve a second signature of the first malware object. In some embodiments, a malware inspector is configured to inspect for a plurality of malware types, each malware corresponding to a signature retrieved from a malware database.

At S530, the workload is inspected for malware. In an embodiment, an inspectable disk is generated based on a disk which is associated with the workload. For example, according to an embodiment, a clone, a copy, a snapshot, a combination thereof, and the like, are generated based on a disk allocated to the workload. In an embodiment, a volume is generated based on the cloned disk, and provisioned to a malware inspector workload, which is configured to inspect the volume to determine if a malware object is present.

This is advantageous as it allows the workload to continue undisturbed (i.e., without devoting resources of the workload to inspection), while inspection is performed on the volume generated from the cloned disk, without degrading from the performance of a workload in a production environment. Inspecting the actual workload would require the workload to devote compute resources to both the functions executed by the workload, and to the malware inspection processes. By inspecting an inspectable disk based on the allocated disk of the workload, the actual workload can continue to run in the production environment while the volume is inspected by an inspector.

Furthermore, in an embodiment an inspector workload is configured to inspect multiple workloads simultaneously, while agent-based solutions, such as antivirus (AV) software requires an instance installed on each workload, which utilizes processor, memory, and storage resources. It is therefore advantageous to allocate resource of a compute environment, such as memory, storage, and processors, to an inspector workload, which is configured to inspect the workloads in the compute environment. This is more efficient than installing an inspector software application on each workload, and requiring each workload to devote a portion of its resources to malware inspection, according to an embodiment.

At S540, a check is performed to determine if malware is detected. If 'yes' execution continues at S550; otherwise, execution terminates, according to an embodiment. In certain embodiments, if no malware is detected, execution continues at S510 to select another workload for inspection of malware. In certain embodiments, where no malware is detected, execution continues at S530, with the malware inspector inspecting the workload for another malware (i.e., another type of malware). In an embodiment, the check is performed by the malware inspector of the inspecting cloud environment.

At S550, an impact analysis is generated. An impact analysis includes, in an embodiment, traversing a security graph to detect a node connected to a node representing the infected workload. For example, in an embodiment, the impact analysis includes generating an output including a node identifier (e.g., name, IP address, etc.) of a detected node, wherein the detected node is connected with a 'can access' vertex to a node representing a malware-infected workload. In some embodiments, the impact analysis is generated by a workload of an inspecting cloud environment, such as the security graph workload 124 of FIG. 1.

In certain embodiments, the impact analysis includes generating a first list of workloads, each workload represented by a node which is connected directly to the node representing the malware-infected workload. In some embodiments, the impact analysis includes generating a second list of workload, each workload represented by a node which is connected directly to a node representing a workload of the first list. The workloads of the second list are at a secondary risk of infection, and are potentially infected with malware if workloads of the first list are infected with malware. In an embodiment, a 'N+1' list is generated of workloads which are each represented by a node connected to a node representing a workload of an $N^{th}$ list, where 'N' is an integer having a value of '1' or greater.

Generating such lists allows to determine the impact of any one particular workload becoming infected with malware. This is advantageous as it allows to detect weak spots in a cloud computing environment from a cybersecurity perspective. Further, a control can be set, in an embodiment, to generate a mitigation action in response to detecting that a single workload infected with malware jeopardizes a number of workloads which exceeds a threshold. For example, in an embodiment, detecting a workload having a number of workloads on a first list which exceeds a first threshold and a number of workloads on a second list which exceeds a second threshold, initiates a mitigation action. In an embodiment, a mitigation action includes generating an alert based on the detection, generating an instruction for the workload on which the malware object is detected to isolate the malware object, generating an instruction which limits network communication to the workload, generating an instruction which limits network communication from the workload, initiating an anti-virus software on the workload, a combination thereof, and the like.

Figure 6:
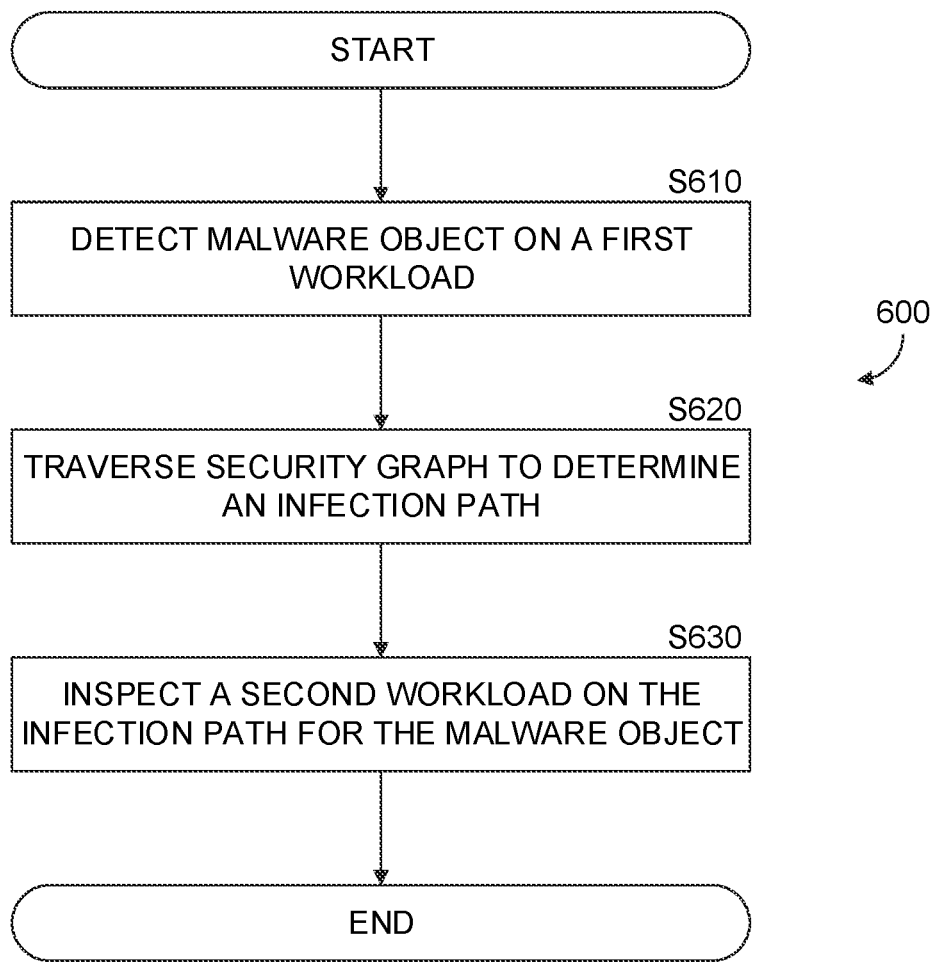
FIG. 6 is a flowchart for utilizing a security graph in determining a malware infection path, implemented in accordance with an embodiment.

FIG. 6 is an example of a flowchart 600 for utilizing a security graph in determining a malware infection path, implemented in accordance with an embodiment.

At S610, a malware object is detected on a first workload. In an embodiment, the malware object is detected using the technique disclosed for example in FIG. 5 above. In an embodiment detecting a malware object includes configuring a malware inspector to inspect the first workload for the malware object. In an embodiment, the malware object is detected based on a signature. In some embodiments, the signature is associated with an identifier of the malware object, which is a unique name, for example. In certain embodiments, the first workload includes an identifier, such as a unique name from a namespace, an IP address, a combination thereof, and the like.

At S620, a security graph is traversed to determine an infection path of the malware object. For example, in an embodiment, a query is generated for the security graph to detect a node representing the first workload. The query is based on an identifier of the first workload, according to some embodiments. Determining an infection path includes, in an embodiment, detecting a node representing a second workload, which is connected to the node representing the first workload. For example, a second node is connected to the node representing the first workload with a 'can access' vertex, indicating that the first workload can access a second workload represented by the second node. For example, the first workload is a serverless function, and the second workload is an S3 bucket.

In certain embodiments, a plurality of nodes are detected, for example from the node representing the first workload, up to an endpoint node (e.g., a node representing access to a public network, external network, and the like). Where a plurality of nodes are detected, an infection path is determined between them, so that the node representing the first workload is connected to a second node representing a second workload, the second node is connected to a third node, and so on, until a node is connected to an endpoint node.

In an embodiment an endpoint node is a node which represents an entity which has access to a computing environment which is external to the cloud computing environment in which the first workload is deployed. For example, an endpoint node represents a public network (e.g., the Internet), in an embodiment, a device which has access to a public network, etc., according to some embodiments, and the like.

In some embodiments, a security graph is traversed to detect all nodes which form a path between the first workload and a node representing the public network. In some embodiments the path is provided as an output, including, for example, identifiers of each workload along the path.

At S630, an instruction is generated to inspect a second workload. The second workload is a workload which is represented by a node on the determined infection path. In some embodiments, a second workload node is connected directly to the infected first workload node. In certain embodiments, the second workload is connected via additional nodes to the first workload node.

It should be noted that by inspecting additional workloads on a malware infection path, malware is detected in an expedient manner, allowing to contain a cybersecurity threat in an efficient manner. This prioritizes inspecting workloads which are at a higher risk category for infection, as they are on an infection path. While other workloads may have a higher priority in terms of their impact (e.g., store sensitive data), it may be more beneficial to prioritize inspection of workloads on an inspection path as they are more likely to be infected, according to some embodiments. Where the threat is contained along the infection path, the higher priority workloads may be spared from malware infection altogether.

Figure 7:
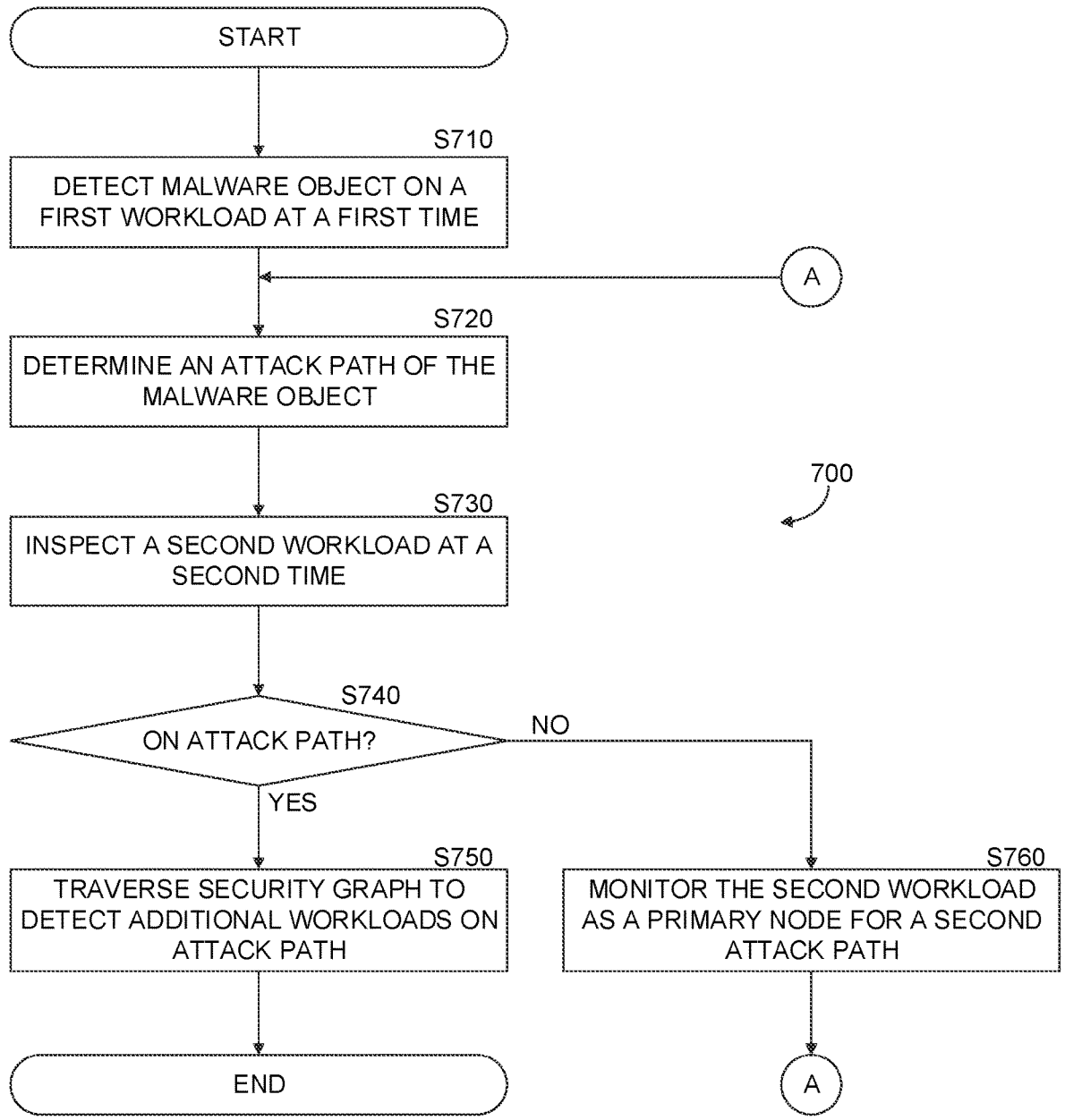
FIG. 7 is a flowchart for detecting a malware attack path utilizing a security graph, implemented in accordance with an embodiment.

FIG. 7 is an example of a flowchart 700 for detecting a malware attack path utilizing a security graph, implemented in accordance with an embodiment. While an infection path describes how malware arrived to a first workload, an attack path is a path through which the malware may spread through a network environment, such as a cloud computing environment.

At S710, a first malware object is detected on a first workload, at a first time interval. In an embodiment, detecting a malware object on a workload is performed by inspecting the workload, a disk associated with the workload, a storage area associated with the workload, an inspectable disk generated based on the workload, a combination thereof, and the like. In some embodiments, an order of the direction of malware spread is determined. For example, in an embodiment a timestamp is stored for each workload in which a malware object is detected, based on the first time interval. A direction is determined, according to an embodiment, by ordering a list of identifiers of workloads based on the timestamps.

At S720, an attack path of the malware object is determined. In an embodiment, determining an attack path includes traversing a security graph to detect a node which represents a second workload which the first workload (i.e., an infected workload) is authorized to access.

In some embodiments, detecting the node representing the second workload includes traversing the graph to detect a node which is connected to the node representing the first workload with a specific vertex, for example a vertex indicating access. In certain embodiments a plurality of attack paths is detected for each first workload.

At S730, a second workload is inspected at a second time. In an embodiment, the second time is a time which is after the first time interval. In some embodiments, a second workload is a workload which is not the first workload. The second time occurs after the first time, meaning that the second workload is inspected after the first workload.

In some embodiments, the second workload is inspected at multiple second times. In an embodiment the second workload does not present with a malware object at a first inspection (e.g., at a first "second time"), and does present with a malware object at a second inspection, which is performed after the first inspection (e.g., at a second "second time").

At S740, a check is performed to determine if the second workload is on the determined attack path. If 'yes' execution continues at S750, otherwise execution continues at S760.

At S750, the security graph is traversed to detect additional workloads on the attack path. In an embodiment, a check is performed to determine if additional workloads on the attack path require inspection. If additional workloads are detected on the attack path, instructions may be generated to inspect the additional workloads for the first malware. By inspecting the additional workloads as early as possible, malware containment may be sped up, as the most likely workloads to be infected are inspected first. Furthermore, inspection resources may be saved, for example by only inspecting relevant workloads. For example, if the first malware is based on a first type of operating system, such as a Linux™ based malware, there is no need to inspect workloads operating a second type of operating system, such as Windows® based workloads, as they are not likely to be infected with the first malware, even if they are on the attack path. Thus, in an embodiment, inspection resources may be devoted to where the risk is most pertinent, allowing to both contain and mitigate risks faster, while utilizing less compute resources.

At S760, additional attack paths are determined, based on the second workload. In some embodiments execution may then continue at S720. In an embodiment where the second workload is not on an attack path of the malware from the first workload, then the second workload is possibly infected by the malware from a source other than the first workload. Therefore, it is beneficial, according to an embodiment, to detect an infection path, attack path, or both, from the second workload to determine if an additional security threat exists. For example, in an embodiment the steps above are performed from S720, where the second workload is treated as the first workload.

Figure 8:
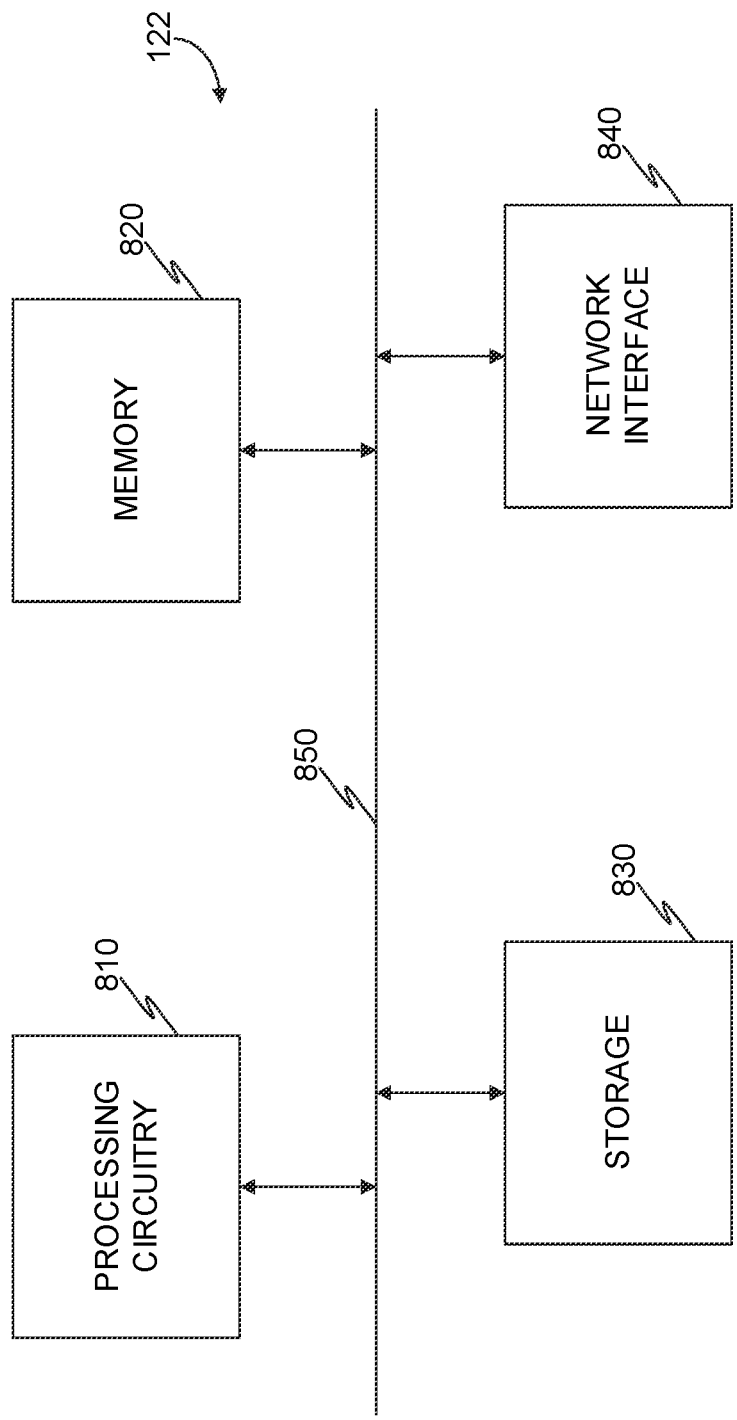
FIG. 8 is a schematic diagram of a malware inspector according to an embodiment.

FIG. 8 is an example schematic diagram of a malware inspector 122 according to an embodiment. The malware inspector 122 includes a processing circuitry 810 coupled to a memory 820, a storage 830, and a network interface 840. In an embodiment, the components of the malware inspector 122 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, or any other medium which can be used to store the desired information.

The network interface 840 allows the malware inspector 122 to communicate with, for example, workloads of the inspecting cloud environment 120.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting a malware infection path in a compute environment, comprising:
    detecting a malware object on a first workload in a computing environment, the computing environment including a plurality of workloads, wherein the first workload is represented by a resource node on a security graph, the security graph further including an endpoint node representing a resource which is accessible to a public access network;
    traversing the security graph from the resource node to the endpoint node to generate a potential infection path between the resource node and the endpoint node including a plurality of second nodes, each second node of the plurality of second nodes connected to at least another second node of the plurality of second nodes with a vertex indicating that a workload represented by the second node can access a workload represented by the another second node, wherein a second resource node of the plurality of second nodes is connected to the resource node;
    generating a list including a plurality of identifiers, each identifier corresponding to a workload represented by a second node of the plurality of second nodes;

inspecting, based on the generated list, a second workload of the plurality of workloads represented by the second resource node;

determining that the potential infection path is a confirmed infection path, in response to detecting the malware object on the second workload; and determining that the potential infection path is not an infection path, in response to detecting that the second workload does not include the malware object.

2. A The method of claim 1, further comprising:
generating an instruction to inspect the first workload to detect the malware object.

3. The method of claim 2, further comprising:
generating an inspectable disk from a disk of the first workload; and
provisioning the inspectable disk to a malware inspector, wherein the malware inspector is a software application executed on a node of a software container cluster in an inspection environment.

4. The method of claim 1, further comprising:
accessing a malware database to retrieve a first malware signature corresponding to the malware object; and
inspecting the first workload for the malware object based on the first malware signature.

5. The method of claim 1 further comprising:
generating an impact analysis of the malware object on the potential infection path.

6. The method of claim 5, further comprising:
generating an impact analysis output, including an identifier of a second workload represented in the security graph by a node connected via a vertex to the node representing the first workload, wherein the connecting vertex indicates that the first workload can access the second workload.

7. The method of claim 1, further comprising:
generating an instruction to inspect a workload represented in the security graph by a node on the confirmed infection path for the malware object.

8. The method of claim 7, further comprising:
inspecting a third workload which is represented in the security graph by a third resource node which is connected to a node which is associated with the confirmed infection path.

9. The method of claim 1, further comprising:
initiating a mitigation action for the first workload.

10. The method of claim 9, further comprising:
generating the mitigation action which includes any one of: generating an alert based on detecting the malware object, generating an instruction for the first workload on which the malware object is detected to isolate the malware object, generating an instruction which limits network communication to the first workload, generating an instruction which limits network communication from the first workload, initiating an anti virus software on the first workload, and a combination thereof.

11. A non-transitory computer readable medium having stored thereon instructions for causing a processing circuitry to execute a process, the process comprising:
detecting a malware object on a first workload in a computing environment, the computing environment including a plurality of workloads, wherein the first workload is represented by a resource node on a security graph, the security graph further including an endpoint node representing a resource which is accessible to a public access network;
traversing the security graph from the resource node to the endpoint node to generate a potential infection path between the resource node and the endpoint node including a plurality of second nodes, each second node of the plurality of second nodes connected to at least another second node of the plurality of second nodes with a vertex indicating that a workload represented by the second node can access a workload represented by the another second node, wherein a second resource node of the plurality of second nodes is connected to the resource node;

generating a list including a plurality of Identifiers, each identifier corresponding to a workload represented by a second node of the plurality of second nodes;

inspecting, based on the generated list, a second workload of the plurality of workloads represented by the second resource node;

determining that the potential infection path is a confirmed infection path, in response to detecting the malware object on the second workload; and determining that the potential infection path is not an infection path, in response to detecting that the second workload does not include the malware object.

12. A system for detecting a malware infection path in a compute environment, comprising:
a processing circuitry; and
a memory, the memory containing instructions that, when executed by the processing circuitry, configure the system to:

detect a malware object on a first workload in a computing environment, the computing environment including a plurality of workloads, wherein the first workload is represented by a resource node on a security graph, the security graph further including an endpoint node representing a resource which is accessible to a public access network;

traverse the security graph from the resource node to the endpoint node to generate a potential infection path between the resource node and the endpoint node including a plurality of second nodes, each second node of the plurality of second nodes connected to at least another second node of the plurality of second nodes with a vertex indicating that a workload represented by the second node can access a workload represented by the another second node, wherein a second resource node of the plurality of second nodes is connected to the resource node;

generate a list including a plurality of identifiers, each identifier corresponding to a workload represented by a second node of the plurality of second nodes;

inspect, based on the generated list, a second workload of the plurality of workloads represented by the second resource node;

determine that the potential infection path is a confirmed infection path, in response to detecting the malware object on the second workload; and determine that the potential infection path is not an infection path, in response to detecting that the second workload does not include the malware object.

13. The system of claim 12, wherein the memory contains further instructions which when executed by the processing circuitry further configure the system to:
generate an instruction to inspect the first workload to detect the malware object.

14. The system of claim 13, wherein the memory contains further instructions which when executed by the processing circuitry further configure the system to:
generate an inspectable disk from a disk of the first workload; and provision the inspectable disk to a malware inspector, wherein the malware inspector is a software application executed on a node of a software container cluster in an inspection environment.

15. The system of claim 12, wherein the memory contains further instructions which when executed by the processing circuitry further configure the system to:
   access a malware database to retrieve a first malware signature corresponding to the malware object; and
   inspect the first workload for the malware object based on the first malware signature.

16. The system of claim 12, wherein the memory contains further instructions which when executed by the processing circuitry further configure the system to:
   generate an impact analysis of the malware object on the potential infection path.

17. The system of claim 16, wherein the memory contains further instructions which when executed by the processing circuitry further configure the system to:
   generate an impact analysis output, including an identifier of a second workload represented in the security graph by a node connected via a vertex to the node representing the first workload, wherein the connecting vertex indicates that the first workload can access the second workload.

18. The system of claim 12, wherein the memory contains further instructions which when executed by the processing circuitry further configure the system to:
   generate an instruction to inspect a workload represented in the security graph by a node on the confirmed infection path for the malware object.

19. The system of claim 18, wherein the memory contains further instructions which when executed by the processing circuitry further configure the system to:
   inspect a third workload which is represented in the security graph by a third resource node which is connected to a node which is associated with the confirmed infection path.

20. The system of claim 12, wherein the memory contains further instructions which when executed by the processing circuitry further configure the system to:
   initiate a mitigation action for the first workload.

21. The system of claim 20, wherein the memory contains further instructions which when executed by the processing circuitry further configure the system to:
   generate the mitigation action which includes any one of: generating an alert based on detecting the malware object, generating an instruction for the first workload on which the malware object is detected to isolate the malware object, generating an instruction which limits network communication to the first workload, generating an instruction which limits network communication from the first workload, initiating an anti-virus software on the first workload, and a combination thereof.

* * * * *

UNITED STATES PATENT AND TRADEMARK OFFICE
CERTIFICATE OF CORRECTION

PATENT NO.         : 11,706,252 B1
APPLICATION NO.    : 18/087936
DATED              : July 18, 2023
INVENTOR(S)        : Elad Gabay et al.

Page 1 of 1

It is certified that error appears in the above-identified patent and that said Letters Patent is hereby corrected as shown below:

In the Claims

Claim 2, should read:
2. "The method of claim 1, further comprising:
generating an instruction to inspect the first workload to detect the malware object"

Signed and Sealed this
Twenty-sixth Day of September, 2023

Katherine Kelly Vidal
*Director of the United States Patent and Trademark Office*